2 Sheets—Sheet 1.
A. H. GRENNELL.
Vine Protector.
14,654.
Patented April 15, 1856.
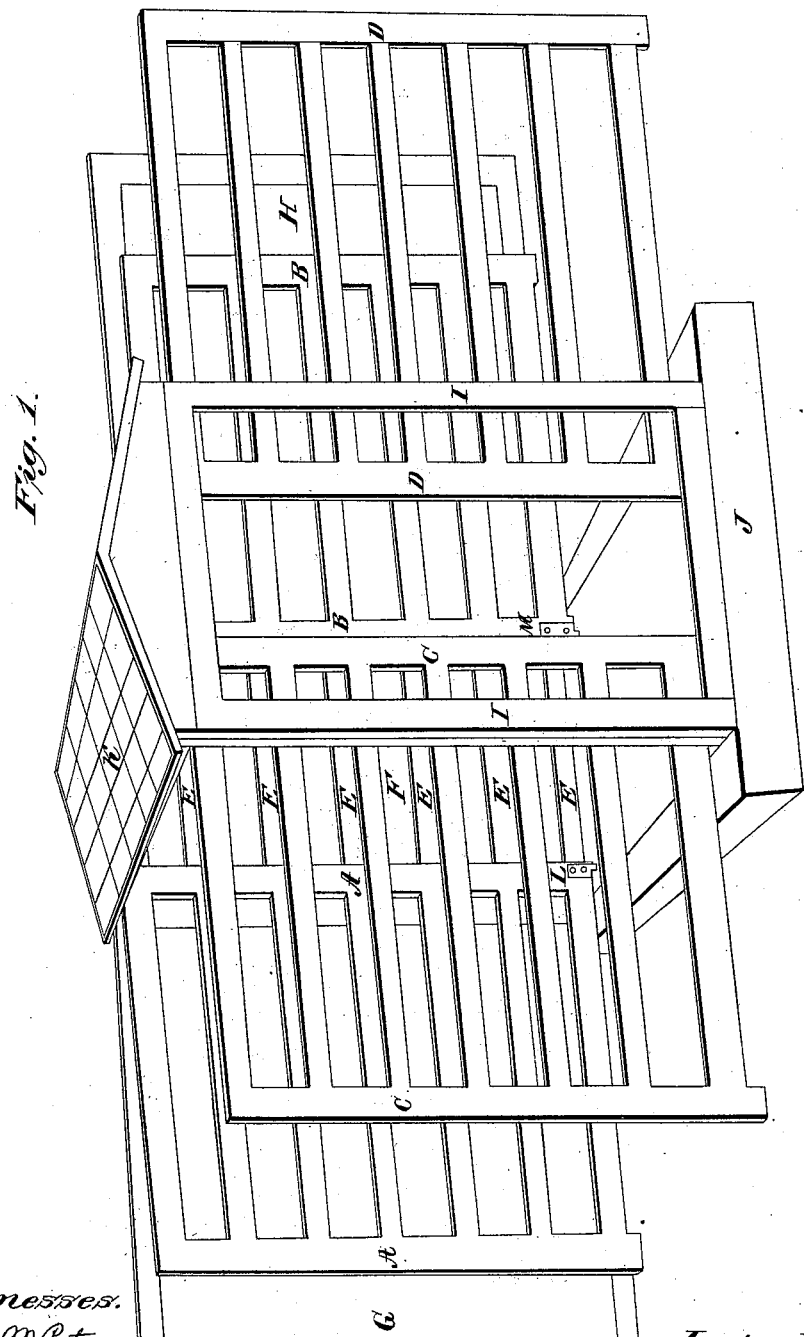

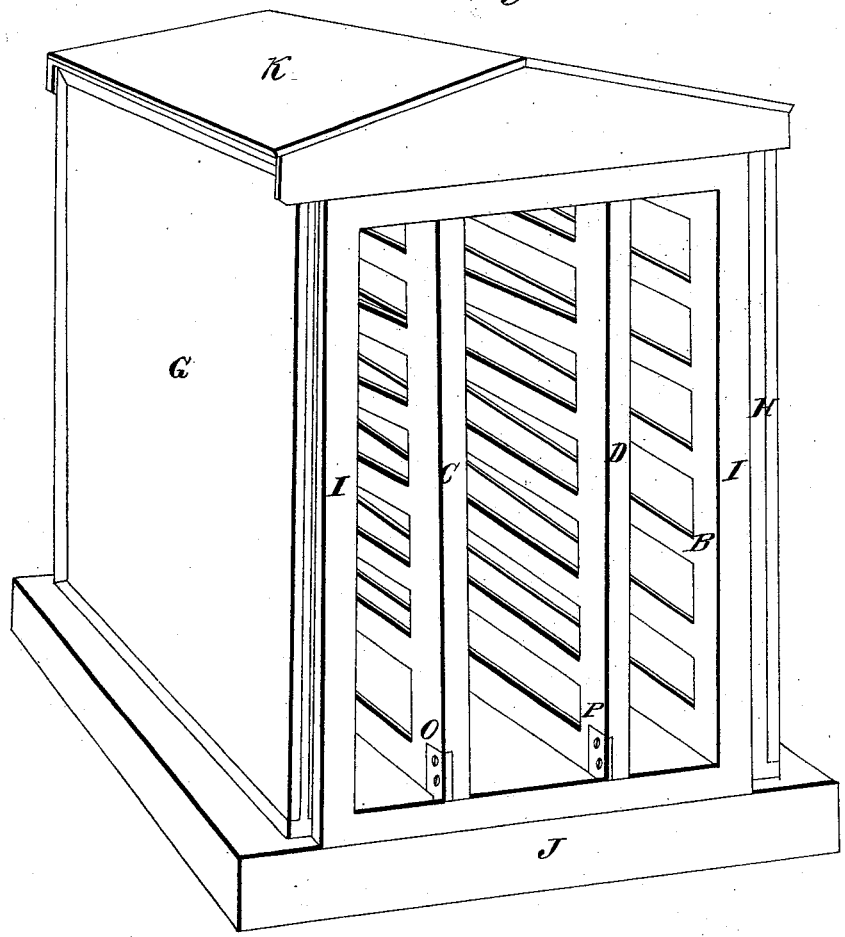

UNITED STATES PATENT OFFICE.

ABEL H. GRENNELL, OF SPRINGFIELD, VERMONT.

IMPROVEMENT IN MODE OF PROTECTING VINES.

Specification forming part of Letters Patent No. 14,654, dated April 15, 1856.

*To all whom it may concern:*

Be it known that I, ABEL H. GRENNELL, of Springfield, in the county of Windsor and State of Vermont, have invented a new and Improved Mode of Protecting Grape or other Vines from Atmospheric Changes and Injury; and I do hereby declare that the following is a full and exact description thereof, reference being had to the accompanying drawings, of which—

Figure 1 is a perspective view with the lattice-frames extended, and Fig. 2 a perspective view of the grapery as closed, in both drawings a glass door in front being removed, and to the letters of reference marked thereon.

The nature of my invention consists in so constructing the lattice-frames upon which the vines are to be trained as to permit them to be swung into a compact form and protected by closing around them suitable double doors and glass sashes, thereby forming a greenhouse, or extended so as to receive the rays of the sun.

To enable others skilled in the art to make and use my invention, I will proceed to describe its construction and operation.

A A B B C C D D represent lattice-frames, perhaps ten feet square, suitable for training grape or other vines upon, and so constructed as to be swung backward or forward upon hinges or pivots, the lower ones of A A and B B being shown in Fig. 1 and marked respectively L and M, and the lower ones of C C and D D being shown in Fig. 2, and marked respectively O and P. The upper ones are not visible in the drawings. The rear lattices, A A and B B, are placed near the edge of the outer frame, and the front ones, C C and D D, nearer the center, so that when the two latter are swung through an arc of ninety degrees they will swing within the two former and permit them to be swung through the same arc outside of them and then stand parallel to them and north and south, the front of the drawings being the south.

G and H are double doors, so made as to contain between their outer and inner surfaces a column of air to serve as a non-conductor and protect the plants from outward changes of temperature when closed, and also to serve, when open, as a back wall for the purpose of reflecting the rays of the sun upon the vines, it being so placed as to face the south, and swinging, like the lattice-frames, upon hinges or pivots outside of them when closed.

F represents the back side or north side of the grapery, made double, like the doors, for the same reason; and E E, &c., are slots fastened to it for a vine to be trained upon.

K is in Fig. 1 a glass roof covering the whole, when closed, which in Fig. 2 is represented covered with boards or otherwise.

J is the front sill of the frame, and I I the two front uprights supporting the roof K, the frame, when closed, being perhaps ten feet deep and high and six feet wide. When closed it represents and is in fact an ordinary greenhouse, and may be used as such at that time; and when open it discloses a large extent of frame-work for the vines.

The vines should be planted near the hinges, so as to suffer as little from the slight torsion to which they are exposed as possible, and trained each upon its own lattice. Then to close it, carefully close by swinging inwardly the lattices C C and D D till they stand north and south, (if the frame is placed to face the south.) Then A A and B B may be closed. The doors G and H may be swung around so as to inclose them, the glass front replaced, and, if necessary, the roof K be covered. To open the lattices the operation is reversed. Care should be taken that the inner frames are made sufficiently short to swing within the two outer without injury to the vines.

What I claim as my invention, and desire to secure by Letters Patent, is—

The so constructing the lattice-frames A A, B B, C C, and D D that they may be swung, with the vines upon them, into a compact form and be protected by closing around them the double doors G and H, to protect the vines from the weather, as above set forth and described.

ABEL H. GRENNELL.

Witnesses:
ABIJAH M. SQUIERS,
SAML. W. PORTER.